United States Patent
Wu et al.

(10) Patent No.: US 11,783,166 B2
(45) Date of Patent: Oct. 10, 2023

(54) METHOD AND APPARATUS FOR CONVERTING NUMERICAL VALUES INTO SPIKES, ELECTRONIC DEVICE AND STORAGE MEDIUM

(71) Applicant: LYNXI TECHNOLOGIES CO., LTD., Beijing (CN)

(72) Inventors: Zhenzhi Wu, Beijing (CN); Wei He, Beijing (CN); Luojun Jin, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/800,172

(22) PCT Filed: Jul. 23, 2021

(86) PCT No.: PCT/CN2021/108134
§ 371 (c)(1),
(2) Date: Aug. 16, 2022

(87) PCT Pub. No.: WO2022/017498
PCT Pub. Date: Jan. 27, 2022

(65) Prior Publication Data
US 2023/0104942 A1 Apr. 6, 2023

(30) Foreign Application Priority Data

Jul. 24, 2020 (CN) .......................... 202010725094.4
Jul. 24, 2020 (CN) .......................... 202010725977.5

(51) Int. Cl.
*G06N 3/049* (2023.01)
*G06N 3/063* (2023.01)

(52) U.S. Cl.
CPC ............. *G06N 3/049* (2013.01); *G06N 3/063* (2013.01)

(58) Field of Classification Search
CPC ..................................................... G06N 3/049
See application file for complete search history.

(56) References Cited

U.S. PATENT DOCUMENTS

| 4,893,255 A * | 1/1990 | Tomlinson, Jr. ....... | G06N 3/049 708/801 |
| 4,984,176 A * | 1/1991 | Van den Heuvel .... | G06N 20/00 706/46 |

(Continued)

FOREIGN PATENT DOCUMENTS

| CN | 107733566 A | 2/2018 |
| CN | 108574535 A | 9/2018 |

(Continued)

OTHER PUBLICATIONS

J. Rodrigues de Oliveira Neto, J. P. Cerquinho Cajueiro and J. Ranhel, "Neural encoding and spike generation for Spiking Neural Networks implemented in FPGA," 2015 International Conference on Electronics, Communications and Computers (CONIELECOMP), Cholula, Mexico, 2015, pp. 55-61 (Year: 2015).*

(Continued)

*Primary Examiner* — James D. Rutten
(74) *Attorney, Agent, or Firm* — Li & Cai Intellectual Property (USA) Office (57) ABSTRACT

The present disclosure provides a method for converting numerical values into spikes. The method includes: generating an initial spike sequence according to input numerical values, where the initial spike sequence includes at least one data string, each of which is independently selected from one of a consecutive spike train or a consecutive non-spike train, the number of spikes in all of the at least one data string is equal to an expected value of the number of spikes in a target spike sequence to be generated, and the target spike sequence to be generated is a spike sequence of a spiking neural network within a time period; and randomly (Continued)

selecting and modifying data from the initial spike sequence, so as to form the target spike sequence. The present disclosure further provides an apparatus for converting numerical values into spikes, an electronic device, and a computer-readable storage medium.

20 Claims, 4 Drawing Sheets

(56) References Cited

U.S. PATENT DOCUMENTS

| | | | | |
|---|---|---|---|---|
| 9,020,870 | B1 * | 4/2015 | Daily | B25J 9/00 706/20 |
| 2004/0204769 | A1 * | 10/2004 | Richmond | A61F 2/72 623/25 |
| 2006/0233456 | A1 * | 10/2006 | Ahn | G06T 5/20 382/275 |
| 2012/0259804 | A1 * | 10/2012 | Brezzo | G06N 3/063 706/33 |
| 2015/0101011 | A1 * | 4/2015 | Hutton | H04L 63/145 726/1 |
| 2015/0122421 | A1 | 5/2015 | Konno et al. | |
| 2015/0220832 | A1 * | 8/2015 | Lazar | G06N 3/049 706/25 |
| 2015/0286924 | A1 * | 10/2015 | Arthur | G06N 7/01 706/25 |
| 2018/0204131 | A1 * | 7/2018 | Najafi | G06N 7/01 |
| 2019/0228495 | A1 * | 7/2019 | Tremblay | G06N 3/045 |
| 2020/0074272 | A1 | 3/2020 | Okazawa | |
| 2020/0293860 | A1 * | 9/2020 | Grassmann | G01S 7/417 |

FOREIGN PATENT DOCUMENTS

| | | |
|---|---|---|
| CN | 109800870 A | 5/2019 |
| CN | 111860786 A | 10/2020 |
| CN | 111898737 A | 11/2020 |

OTHER PUBLICATIONS

M. Zhang, Z. Gu, N. Zheng, D. Ma and G. Pan, "Efficient Spiking Neural Networks With Logarithmic Temporal Coding," in IEEE Access, vol. 8, pp. 98156-98167, 2020, doi: 10.1109/ACCESS.2020.2994360. (Year: 2020).*

A. Taherkhani, G. Cosma and T. M. McGinnity, "Optimization of Output Spike Train Encoding for a Spiking Neuron Based on its Spatio-Temporal Input Pattern," in IEEE Transactions on Cognitive and Developmental Systems, vol. 12, No. 3, pp. 427-438, Sep. 2020, doi: 10.1109/TCDS.2019.2909355. (Year: 2020).*

WIPO, International Search Report dated Oct. 10, 2021, Non-English version.

Europeant Patent Office, The extended European search report dated Jul. 7, 2023 for EP application EP21846143.2.

James D. McCaffrey," Generating Artificial Spike Trains for Spiking Neural Networks", Dec. 13, 2019 (Dec. 13, 2019), pp. 1-2, XP93058609, Retrived from the Internet: URL: https://jamesmccaffery.wordpress.com/2019/12/13/generating-artificial-spike-trains-for-spiking-neural-networks/ *the whole document*.

Zhang Ming, et al:"Efficient Spiking Neural Networks With Logarithmic Temporal Coding", IEEE Access, IEEE, USA, vol. 8, May 12, 2020 (May 12, 2020), pp. 98156-98167, XP011791152, DOI: 10.1109/ACCESS. 2020.2994360 *abstract; sections III, III. B*.

Tang Hoyoung, et al:"Spike Counts Based Low Complexity SNN Architecture With Binary Synapse", IEEE Transactions on Biomedical Circuits and Systems, IEEE, US, vol. 13, No. 6, Oct. 4, 2019 (Oct. 4, 2019), pp. 1664-1677, XP011763629, ISSN: 1932-4545, DOI: 10.1109/TBCAS.2019.2945406, *abstract; sections II, III; figure 1*.

Peter U. Diehl , et al:"Unsupervised learning of digit recognition using spike-timing-dependent plasticity", Frontiers in Computational Neuroscience, vol. 9, Aug. 3, 2015 (Aug. 3, 2012), XP055379807, DOI: 10.3389/fncom.2015.00099*section 2.5*.

* cited by examiner

| Determine, according to the input numerical values, the number of time instants n1 at which a spike is generated in the target spike sequence to be generated, and the number of time instants n2 at which no spike is generated | S111' |
|---|---|
| Form, according to the number of time instants n1 and the number of time instants n2, the initial spike sequence within a current time period | S112' |

METHOD AND APPARATUS FOR CONVERTING NUMERICAL VALUES INTO SPIKES, ELECTRONIC DEVICE AND STORAGE MEDIUM

CROSS-REFERENCE TO RELATED APPLICATIONS

The present application is a National Phase Application filed under 35 U.S.C. 371 as a national stage of PCT/CN2021/108134, filed on Jul. 23, 2021, an application claiming priority form chinese Patent Application No. 202010725977.5, filed on Jul. 24, 2020 in the chines Intellectual Property Office and Chines Patent Application No. 202010725094.4, filed on Jul. 24, 2020 in the Chines Intellectual Property Office, contents of which are hereby incorporated herein by reference in their entirety.

TECHNICAL FIELD

The present disclosure relates to the field of neuron network technology, and specifically relates to a method and an apparatus for converting numerical values into spikes, an electronic device, and a computer-readable storage medium.

BACKGROUND

For current spiking neural networks, the Poisson distribution with expectation n is typically adapted to generate a random spike sequence. Although the Poisson distribution is relatively compatible with biological characteristics, it has the disadvantages of slow spike generation speed and insufficient power consumption efficiency due to higher complexity and unfriendly hardware implementation.

SUMMARY

To solve the problems, an object of the present disclosure is to provide a method and an apparatus for converting numerical values into spikes, an electronic device, and a computer-readable storage medium which can form a random spike sequence having good compatibility with biological characteristics and low costs.

As a first aspect of the present disclosure, there is provided a method for converting numerical values into spikes. The method is used for converting input numerical values into a spike sequence in a spiking neural network, and includes: generating an initial spike sequence according to the input numerical values, wherein the initial spike sequence includes at least one data string, each of which is independently selected from one of a consecutive spike train or a consecutive non-spike train, the number of spikes in all of the at least one data string is equal to an expected value of the number of spikes in a target spike sequence to be generated, and the target spike sequence to be generated is a spike sequence of the spiking neural network within a time period; and randomly selecting and modifying data from the initial spike sequence, to form the target spike sequence.

As a second aspect of the present disclosure, there is provided an apparatus for converting numerical values into spikes. The apparatus is configured to convert input numerical values into a spike sequence in a spiking neural network, and includes: a buffer configured to generate an initial spike sequence according to the input numerical values and store the initial spike sequence, wherein the initial spike sequence includes at least one data string, each of which is independently selected from one of a consecutive spike train or a consecutive non-spike train, the number of spikes in all of the at least one data string is equal to an expected value of the number of spikes in a target spike sequence to be generated, and the target spike sequence to be generated is a spike sequence of the spiking neural network within a time period; and a modifier configured to modify data in the initial spike sequence, to form the target spike sequence.

As a third aspect of the present disclosure, there is provided an electronic device, including a memory and a processor. The memory is configured to store one or more computer instructions, wherein the one or more computer instructions are executed by the processor to implement the above method.

As a fourth aspect of the present disclosure, there is provided a computer-readable storage medium having a computer program stored thereon. The computer program is executed by a processor to implement the above method.

BRIEF DESCRIPTION OF DRAWINGS

To better illustrate the embodiments of the present disclosure or the technical solutions in the existing art, the drawings to be used in descriptions of the embodiments or the existing art will be briefly described below. It should be apparent that the drawings in the following description are merely some embodiments of the present disclosure and, to one of ordinary skill in the art, other drawings may be derived from these drawings without any creative labor.

DETAIL DESCRIPTION OF EMBODIMENTS

The technical solutions in the embodiments of the present disclosure will be described clearly and completely below with reference to the accompanying drawings in the embodiments of the present disclosure. Obviously, the described embodiments are merely some but not all embodiments of the present disclosure. All other embodiments obtained by the those of ordinary skill in the art based on the embodiments of the present disclosure without paying any creative effort shall be included in the protection scope of the present disclosure.

It should be noted that any directional indications (such as up, down, left, right, front, back . . . ) referred in the embodiments of the present disclosure is merely used for explaining the relative positional relationship between components, movement situations, or the like in a particular posture (as shown in the drawings), and when the particular posture is changed, the directional indication is also changed accordingly.

In addition, in the description of the present disclosure, the terms are for illustrative purposes only, and are not intended to limit the scope of the present disclosure. The terms "include" and/or "comprise" are used to specify the presence of elements, steps, operations, and/or components, but do not preclude the presence or addition of one or more other elements, steps, operations, and/or components. The terms "first," "second," and the like may be used to describe various elements, not necessarily order, and not necessarily limit the elements. In addition, in the description of the present disclosure, "a plurality" means two or more unless otherwise specified. These terms are merely used to distinguish one element from another. In view of the following drawings, these and/or other aspects will become apparent to those of ordinary skill in the art, and the description of the embodiments of the present disclosure will be readily understood by those of ordinary skill in the art. The figures depict embodiments of the present disclosure for purposes of illustration only. One skilled in the art will readily recognize from the following description that alternative embodiments of the structures and methods illustrated in the present disclosure may be employed without departing from the principles of the present disclosure.

In order to reduce the complexity of spike generation and increase the hardware efficiency, an option is to directly generate n consecutive spikes, and then no spike is sent. However, the spike sequences generated in this manner are alternatively dense and sparse, not random enough, and have low compatibility with biological characteristics, thereby adversely affecting performance of the spiking neural network to some extent.

Figure 1:
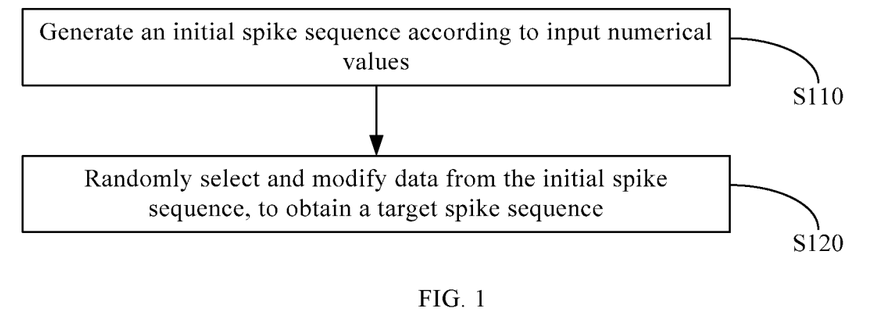
FIG. 1 is a schematic flowchart of a method for converting numerical values into spikes according to the present disclosure.

In view of this, as a first aspect of the present disclosure, there is provided a method for converting numerical values into spikes. The method is used for converting input numerical values into a spike sequence in a spiking neural network, and as shown in FIG. 1, includes the following steps S110 to S120.

At step S110, generating an initial spike sequence according to input numerical values. The initial spike sequence includes at least one data string, each of which is independently selected from one of a consecutive spike train or a consecutive non-spike train, the number of spikes in all of the at least one data string is equal to an expected value of the number of spikes in a target spike sequence to be generated, and the target spike sequence to be generated is a spike sequence of the spiking neural network within a time period.

At step S120, randomly selecting and modifying data from the initial spike sequence, to form the target spike sequence.

The spiking neural network is a network with time dimension encoded information. For example, the minimum time unit for the operation process of the spiking neural network is one time instant. Each time instant may have or not have a spike, and the spike information at each time instant is a binary variable, i.e., with or without a spike. For example, one time period includes T time instants. The encoded information of the spiking neural network may be represented by an expected value of the number of spikes which are randomly sent.

The input numerical values may include, for example, pixel numerical values of an image, numerical values converted from voice waveform, numerical values converted from text, calculation results from image preprocessing, or the like. The input numerical values are not specifically limited in the present disclosure.

In the case where the input numerical values are pixel numerical values of an image, the expected value of the number of spikes (the total number of spikes) in the target spike sequence is in positive correlation with pixel values of the image, the target spike sequence is a spike sequence with random time dimension, and the pixel numerical values of each image are converted into a target spike sequence with random time dimension.

The term "consecutive spike train" described above means that each of a plurality of pieces of consecutive data is a spike (which may be represented by a numerical value 1); and the term "consecutive non-spike train" described above means that none of a plurality of pieces of consecutive data is a spike (which may be represented by a numerical value 0).

According to the method for converting numerical values into spikes of the present disclosure, in step S110, the data string includes consecutive spikes or consecutive non-spikes, and the efficiency of generating any data string is relatively high. Further in step S120, data in the initial spike sequence is randomly modified so that the order of the dense and sparse spikes in the initial spike sequence is broken, and a target spike sequence of high randomness and high compatibility with biological characteristics is obtained. In other words, the method for converting numerical values into spikes of the present disclosure is able to be adapted to a short time period, and beneficial to reducing the number of time instants in the time domain to be calculated, thereby reducing the computation volume; the generated spike sequence is random and uniform in density, thereby improving the compatibility with biological characteristics; and the complexity of hardware is reduced, and hardware resources are saved, thereby improving the hardware efficiency.

In the present disclosure, the number of data strings in the initial spike sequence is not particularly limited. In other words, the initial spike sequence may include one data string, or may include a plurality of data strings.

An implementation of the present disclosure is described below with reference to the drawings. In this implementation, the initial spike sequence includes a plurality of data strings. As an implementation, the plurality of data strings include consecutive spike trains and consecutive non-spike trains.

Randomly selecting and modifying data from the initial spike sequence, to form the target spike sequence (step S120) includes: randomly exchanging positions of the data in the initial spike sequence to form the target spike sequence.

Randomly exchanging positions of the data in the initial spike sequence may improve randomness of the finally generated target spike sequence so that the target spike sequence becomes more compatible with biological characteristics. Moreover, the position exchange of data can be realized without any complex algorithm, and the efficiency of the method provided in the present disclosure is improved.

Figure 2:
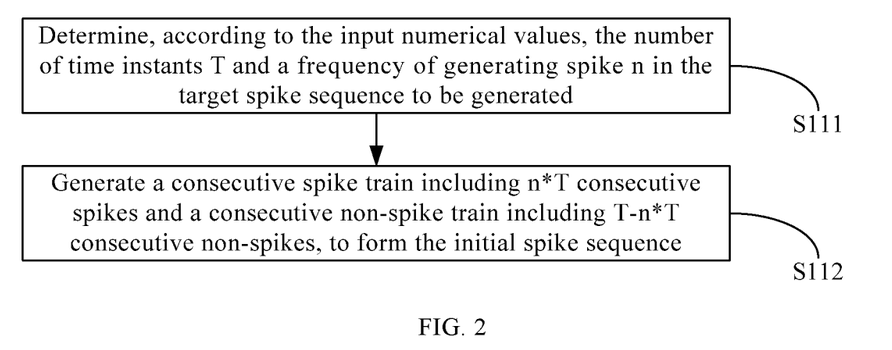
FIG. 2 is a schematic flowchart of step S110 in the method for converting numerical values into spikes according to the present disclosure.

In the present disclosure, how to generate the initial spike sequence is not particularly limited. For example, in an implementation, as shown in FIG. 2, generating the initial spike sequence according to the input numerical values (step S110) may include the following steps S111 to S112.

At step S111, determining, according to the input numerical values, the number of time instants T and a frequency of generating spike n in the target spike sequence to be generated, where T is an integer greater than 0, n is greater than or equal to 0, and n is less than 1.

At step S112, generating a consecutive spike train including n*T consecutive spikes and a consecutive non-spike train including T−n*T consecutive non-spikes, to form the initial spike sequence.

Figure 5:
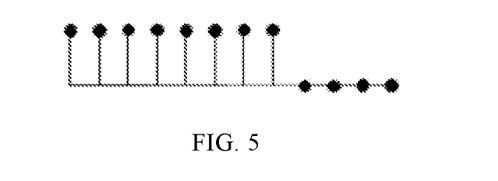
FIG. 5 is a schematic diagram of a consecutive spike sequence generated by the present disclosure.

As described above, the expected value of the number of spikes in the target spike sequence is in positive correlation with pixel values of the image, the target spike sequence is a spike sequence with random time dimension, and the pixel numerical values of each image are converted into a target spike sequence with random time dimension. For example, if the target spike sequence has the number of time instants T=12, and a frequency of generating spike n=67%, then an initial spike sequence as shown in FIG. 5 is generated, which includes 8 consecutive spikes (value 1) and 4 consecutive non-spikes (value 0).

Figure 3:
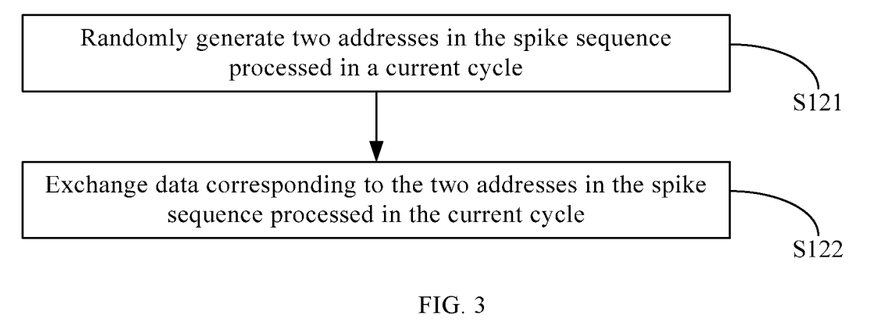
FIG. 3 is a schematic flowchart of an exchange cycle in step S120 in the method for converting numerical values into spikes according to the present disclosure.

In an implementation, the step of randomly exchanging positions of the data in the initial spike sequence to form the target spike sequence includes exchange cycles. Specifically, as shown in FIG. 3, each exchange cycle may include the following steps S121 to S122.

At step S121, randomly generating two addresses in the spike sequence processed in a current cycle.

At step S122, exchanging data corresponding to the two addresses in the spike sequence processed in the current cycle.

The two addresses are different from each other. The spike sequence processed in the first exchange cycle is the initial spike sequence, and the spike sequence processed in the $i^{th}$ exchange cycle is the spike sequence formed through data exchange in the $(i-1)^{th}$ exchange cycle, where i is a natural number greater than or equal to 2.

The above steps S121 and S122 are repeated, until the target spike sequence is obtained after multiple times of data exchange.

In the exchange cycle, each randomly generated address is within a valid address interval [0, T), where T is the number of time instants in the target spike sequence. For any exchange cycle, the data corresponding to each address in the spike sequence processed in the current cycle may be a spike (value 1) or a non-spike (value 0).

Figure 6:
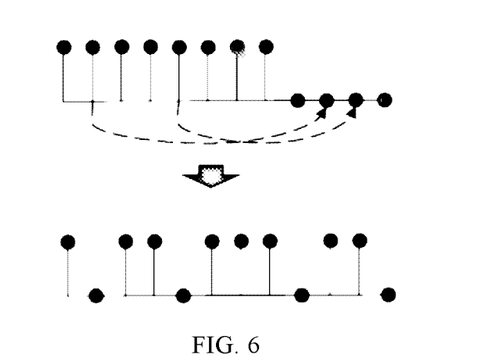
FIG. 6 is a schematic diagram of multiple data exchange processes according to the present disclosure.
Figure 7:
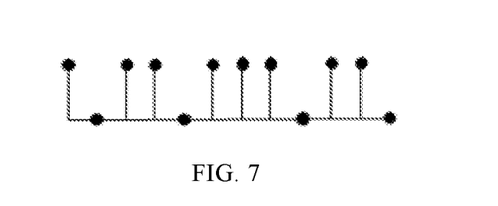
FIG. 7 is a schematic diagram of a target spike sequence formed in the present disclosure.

As described above, by generating consecutive spikes, the speed of spike generation can be increased, and the complexity of hardware is reduced, thereby improving the hardware efficiency, so that the method of the present disclosure is able to be adapted to a short time period, and beneficial to reducing the number of time instants in the time domain to be calculated, thereby reducing the computation volume. The multiple data exchange processes are shown in FIG. 6, and the spike sequence obtained through the multiple data exchanges is the target spike sequence. The formed target spike sequence is shown in FIG. 7. By randomly exchanging positions of the data in the consecutive spike sequence, the new generated spike sequence is random and uniform in density, and the compatibility with biological characteristics is improved. The number of times of data exchanges is not limited in the present disclosure.

In an implementation, randomly generating two addresses in the spike sequence processed in the current cycle (step S121) may include: randomly generating a first address and a second address.

Figure 4:
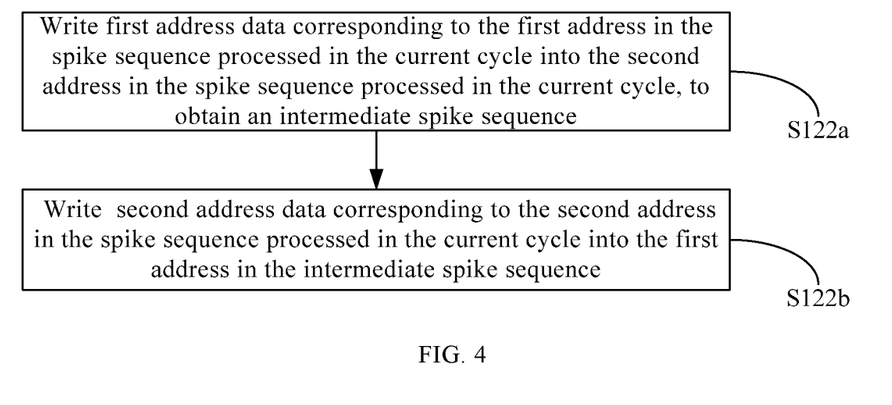
FIG. 4 is a schematic flowchart of step S122.

Accordingly, as shown in FIG. 4, exchanging data corresponding to the two addresses in the spike sequence processed in the current cycle (step S122) may include the following steps S122a to S122b.

At step S122a, writing first address data corresponding to the first address in the spike sequence processed in the current cycle into the second address in the spike sequence processed in the current cycle, to obtain an intermediate spike sequence.

At step S122b, writing second address data corresponding to the second address in the spike sequence processed in the current cycle into the first address in the intermediate spike sequence.

The above implementation is explained below by examples. Two addresses are generated in each data exchange process (namely, one exchange cycle), and each time one address is randomly generated, firstly addrA (the first address) and then addrB (the second address). Firstly, dataA (the first address data) corresponding to addrA in the spike sequence processed in the current cycle is written into addrB in the consecutive spike sequence to obtain an intermediate spike sequence, while dataB (the second address data) corresponding to addrB in the consecutive spike sequence is output. Then, dataB is written into addrA in the intermediate spike sequence to complete one data exchange process.

In an implementation, the first address and the second address randomly generated in one data exchange are different.

In an implementation, the randomly generating two addresses in the consecutive spike sequence may include simultaneously generating two addresses in the valid address interval [0, T), and exchanging data corresponding to the two addresses. How to randomly generate the addresses in the consecutive spike sequence and how to exchange data are not limited in the present disclosure.

Another implementation of the present disclosure is described below with reference to the drawings, in which the initial spike sequence includes one data string.

Figure 8:
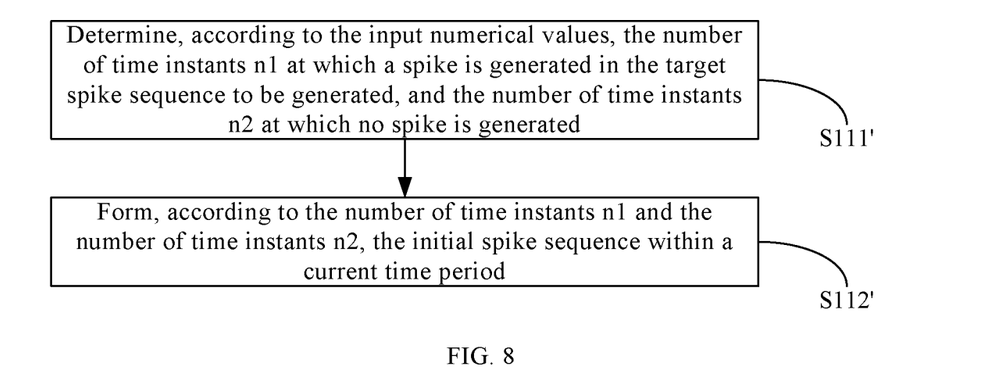
FIG. 8 is another schematic flowchart of the method for converting numerical values into spikes according to the present disclosure.

In this implementation, as shown in FIG. 8, generating the initial spike sequence according to the input numerical values (step S110) may include the following steps S111' to S112'.

At step S111', determining, according to the input numerical values, the number of time instants n1 at which a spike is generated in the target spike sequence to be generated, and the number of time instants n2 at which no spike is generated, where n1 and n2 are both integers greater than or equal to 0, and n1 and n2 are not 0 at the same time. The target spike sequence to be generated is a spike sequence of the spiking neural network within a time period.

At step S112', forming, according to the number of time instants n1 and the number of time instants n2, the initial spike sequence within a current time period. The initial spike sequence is selected from one of a consecutive spike train or a consecutive non-spike train.

Figure 9:
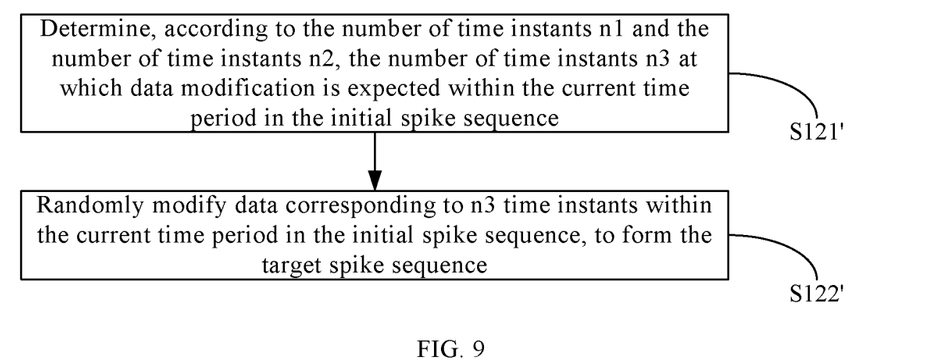
FIG. 9 is a schematic flowchart of step S120'.

Accordingly, as shown in FIG. 9, randomly selecting and modifying data from the initial spike sequence, to form the target spike sequence (step S120) may include the following steps S121' to S122'.

At step S121', determining, according to the number of time instants n1 and the number of time instants n2, the number of time instants n3 at which data modification is expected within the current time period in the initial spike sequence, where n3 is an integer greater than or equal to 0.

At step S122', randomly modifying data corresponding to n3 time instants within the current time period in the initial spike sequence, to form the target spike sequence.

In this implementation, the input numerical values may include, for example, pixel numerical values of an image, numerical values converted from voice waveform, numerical values converted from text, calculation results from image preprocessing, or the like. The input numerical values are not specifically limited in the present disclosure. The n3 time instants for data modification are different from each other.

As described above, the spiking neural network is a network with time dimension encoded information, and in the present disclosure, the minimum time unit for the operation process of the spiking neural network is time instant. Each time instant may have or not have a spike, and the spike information at each time instant is a binary variable, i.e., with or without a spike. For example, one time period includes R time instants, and R=n1+n2, where n1 time instants have spikes, n2 time instants do not have spikes, and spikes are distributed at time instants as random as possible within this time period. The data to be modified may be a spike (e.g., with a value 1) or a non-spike (e.g., with a value 0).

The total number n1 of spikes in the target spike sequence to be generated is in positive correlation with the input numerical values, the target spike sequence is a spike sequence with random time dimension, and each input numerical value is converted into a target spike sequence with random time dimension.

In the present disclosure, whether the data string in the initial spike sequence is a consecutive spike train or a consecutive non-spike train is not particularly limited. In the present disclosure, the specific type of the data string in the initial spike sequence may be determined according to a magnitude relation between n1 and n2.

In an implementation, forming, according to the number of time instants n1 and the number of time instants n2, the initial spike sequence within the current time period (step S112') may include: generating, if the number of time instants n1 is greater than or equal to the number of time instants n2, a spike at each time instant within the current time period, to form the initial spike sequence including a consecutive spike train.

Accordingly, in determining, according to the number of time instants n1 and the number of time instants n2, the number of time instants n3 at which data modification is expected within the current time period in the initial spike sequence (step S121'), it is determined that n3 equals to n2 (i.e., n3=n2).

Figure 10:
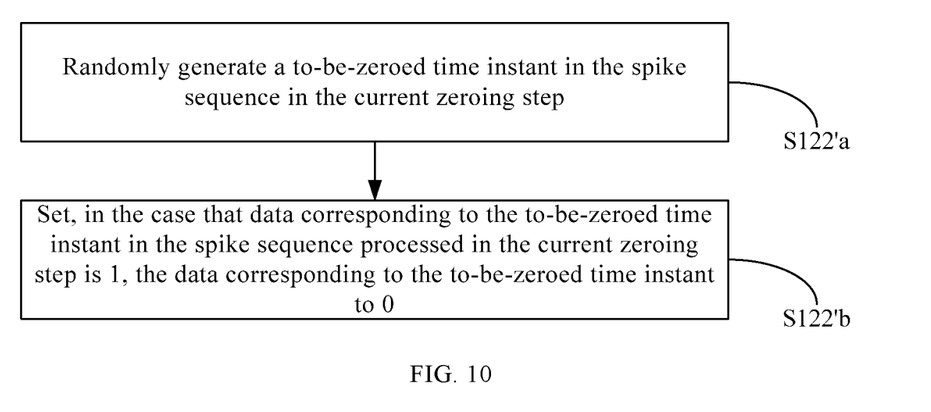
FIG. 10 is a schematic flowchart of a zeroing step.

In the present disclosure, how to perform step S122' is not particularly limited. For the above case in which n3=n2, the step S122' may include performing a zeroing step for n3 times. As shown in FIG. 10, each zeroing step may include the following steps S122'a to S122'b.

At step S122'a, randomly generating a to-be-zeroed time instant in the spike sequence in the current zeroing step.

At step S122'b, setting, in the case that data corresponding to the to-be-zeroed time instant in the spike sequence processed in the current zeroing step is 1, the data corresponding to the to-be-zeroed time instant to 0.

When the zeroing step is executed for the first time, the spike sequence processed in the current zeroing step is the initial spike sequence, when the zeroing step is executed for the $j^{th}$ time, the spike sequence processed in the current zeroing step is a spike sequence generated from the $(j-1)^{th}$ zeroing step, and the spike sequence generated from the final zeroing step is the target spike sequence. It should be noted that j is a natural number, and j=2, . . . n3.

The above describes how to perform steps S112 and S120 specifically when n1 is greater than or equal to n2, while the below describes how to perform steps S112 and S120 specifically when n1 is less than n2.

In an implementation, forming, according to the number of time instants n1 and the number of time instants n2, the initial spike sequence within the current time period (step S112') may include: not generating, if the number of time instants n1 is less than the number of time instants n2, any spike at each time instant within the current time period, to form the initial spike sequence including a consecutive non-spike train.

In determining, according to the number of time instants n1 and the number of time instants n2, the number of time instants n3 at which data modification is expected within the current time period in the initial spike sequence (step S121'), it is determined that n3 equals to n1 (i.e., n3=n1).

Figure 11:
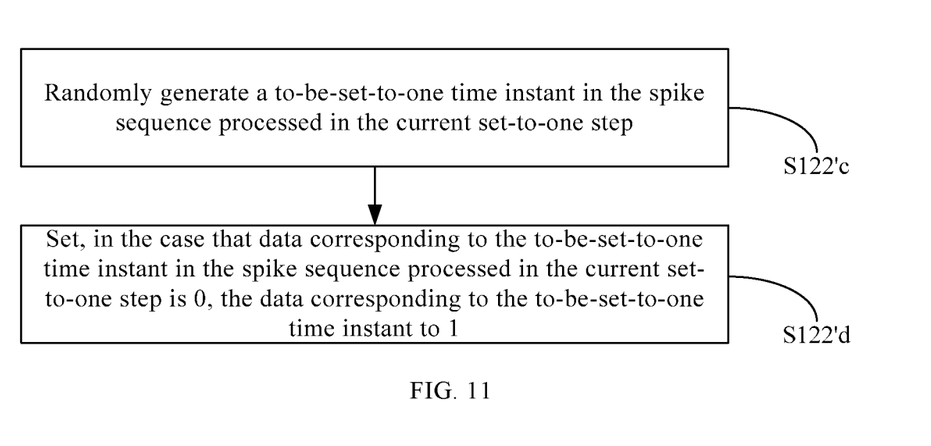
FIG. 11 is a schematic flowchart of a set-to-one step.

For the above case in which n3=n1, the step S122' may include performing a set-to-one step for n3 times. As shown in FIG. 11, each set-to-one step may include the following steps S122'c to S122'd.

At step S122'c, randomly generating a to-be-set-to-one time instant in the spike sequence processed in the current set-to-one step.

At step S122'd, setting, in the case that data corresponding to the to-be-set-to-one time instant in the spike sequence processed in the current set-to-one step is 0, the data corresponding to the to-be-set-to-one time instant to 1.

When the set-to-one step is executed for the first time, the consecutive spike sequence is the initial spike sequence, when the set-to-one step is executed for the $j^{th}$ time, the spike sequence processed in the current set-to-one step is a spike sequence generated from the $(j-1)^{th}$ set-to-one step, and the spike sequence generated from the final set-to-one step is the target spike sequence. It should be noted that j is a natural number, and j=2, . . . n3.

The method of the present disclosure is applied to a spiking neural network, in which one time period includes a plurality of time instants, each time instant has a position which may be 1 (spike) or 0 (non-spike), and all time instants of a same time period form the target spike sequence. For example, the total number of time instants in a time period is R, and R=n1+n2, where n1 time instants have spikes, n2 time instants do not have spikes, and spikes are distributed at time instants as random as possible within this time period. The number of the time instants n1 and the number of time instants n2 may be determined in advance according to the input numerical values. If the number of time instants n1 is greater than or equal to the number of time instants n2, each time instant of the current time period may be set to 1 (i.e., generate a spike), and then the spikes corresponding to n2 time instants therein are randomly deleted; and if the number of time instants n2 is greater than the number of time instants n1, each time instant may be set to 0 (i.e., not generate a spike), and then n1 time instants therein are randomly selected to generate spikes.

With the method of the present disclosure, one the one hand, by generating consecutive spikes, the speed of spike generation can be increased, and the complexity of hardware is reduced, thereby improving the hardware efficiency, so that the method is able to be adapted to a short time period, and beneficial to reducing the number of time instants in the time domain to be calculated, thereby reducing the computation volume; on the other hand, by randomly modifying part of the spikes, the generated spike sequence is random and uniform in density, thereby improving the compatibility with biological characteristics.

Figure 12:
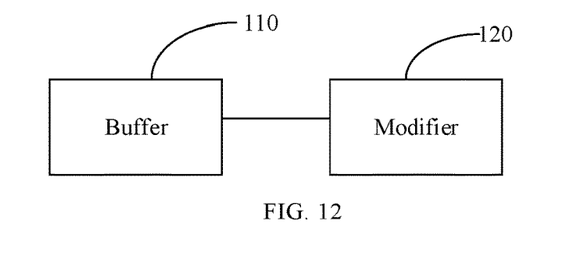
FIG. 12 is a block diagram of an apparatus for converting numerical values into spikes according to the present disclosure.

As a second aspect of the present disclosure, there is provided an apparatus for converting numerical values into spikes. The apparatus is configured to convert input numerical values into a spike sequence in a spiking neural network, and as shown in FIG. 12, the apparatus includes: a buffer 110 configured to generate an initial spike sequence according to the input numerical values and store the initial spike sequence, where the initial spike sequence includes at least one data string, each of which is independently selected from one of a consecutive spike train or a consecutive non-spike train, the number of spikes in all of the at least one data string is equal to an expected value of the number of spikes in a target spike sequence to be generated, and the target spike sequence to be generated is a spike sequence of the spiking neural network within a time period; and a modifier 120 configured to modify data in the initial spike sequence, to form the target spike sequence.

The apparatus of the present disclosure is configured to perform the method according to the first aspect of the present disclosure.

The spiking neural network is a network with time dimension encoded information. By way of example, the minimum time unit for the operation process of the spiking neural network is time instant. Each time instant may have or not have a spike, and the spike information at each time instant is a binary variable, i.e., with or without a spike. For example, one time period includes T time instants. The encoded information of the spiking neural network may be represented by an expected value of the number of spikes which are randomly sent.

Since the principle and beneficial effects of the method have been described in detail above, details are not repeated here.

In an implementation, the buffer 110 is further configured to determine, according to the input numerical values, the number of time instants T and a frequency of generating spike n in the target spike sequence to be generated, and generate a consecutive spike train including n*T consecutive spikes and a consecutive non-spike train including T−n*T consecutive non-spikes, to form the initial spike sequence, where T is an integer greater than 0, n is greater than or equal to 0, and n is less than 1.

As an implementation, the input numerical values may be pixel values of an image. The expected value of the number of spikes (the total number of spikes) in the target spike sequence is in positive correlation with pixel values of the image, the target spike sequence is a spike sequence with random time dimension, and the pixel numerical values of each image are converted into a target spike sequence with random time dimension. For example, if the target spike sequence has the number of time instants T=12, and a frequency of generating spike n=67%, then an initial spike sequence as shown in FIG. 5 is generated, which includes 8 consecutive spikes (value 1) and 4 consecutive non-spikes (value 0).

Figure 13:
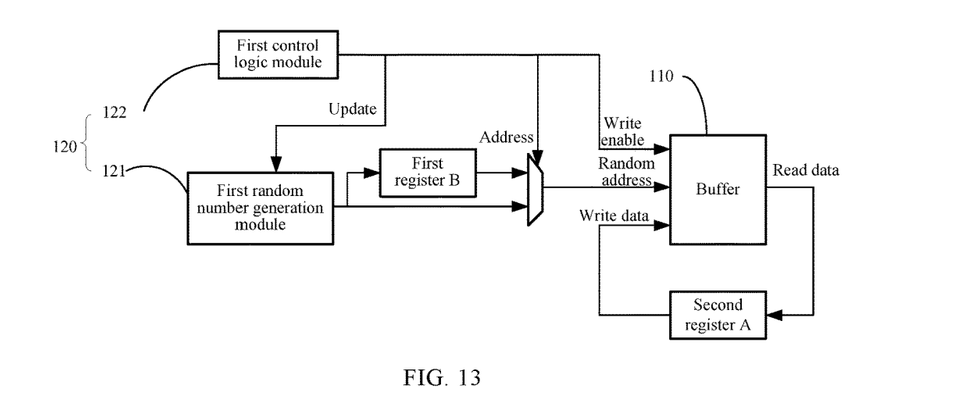
FIG. 13 is another block diagram of the apparatus for converting numerical values into spikes according to the present disclosure.

In an implementation, as shown in FIG. 13, the modifier 120 may include: a first random number generation module 121 configured to randomly generate, in each exchange cycle, two addresses in the spike sequence processed in a corresponding cycle; and a first control logic module 122 configured to exchange, for each exchange cycle, data corresponding to the two addresses in the spike sequence processed in the corresponding cycle.

The two addresses are different from each other. The spike sequence processed in the first exchange cycle is the initial spike sequence, and the spike sequence processed in the $i^{th}$ exchange cycle is a spike sequence formed through data exchange in the $(i-1)^{th}$ exchange cycle, where i is a natural number greater than or equal to 2.

Each randomly generated address is within a valid address interval [0, T), where T is the number of time instants in the target spike sequence. By generating consecutive spikes, the speed of spike generation can be increased, and the complexity of hardware is reduced, thereby improving the hardware efficiency, so that the apparatus is able to be adapted to a short time period, and beneficial to reducing the number of time instants in the time domain to be calculated, thereby reducing the computation volume. The multiple data exchange processes are shown in FIG. 6, and the spike sequence obtained through the multiple data exchanges is the target spike sequence. The formed target spike sequence is shown in FIG. 7. By randomly exchanging spike positions in the spike sequence processed in each current cycle, the new generated spike sequence is random and uniform in density, and the compatibility with biological characteristics is improved.

In an implementation, the apparatus further includes: a first register B configured to store addresses generated by the first random number generation module 121, where each of the addresses is within an address interval [0, T), T is the number of time instants in the target spike sequence, and T is greater than 0; and a second register A configured to store data corresponding to the addresses output from the buffer 110.

In an implementation, the two addresses include a first address and a second address.

The first random number generation module 121 is configured to generate and store the corresponding first address in each exchange cycle in the first register B, and the first random number generation module 121 is further configured to generate and store the corresponding second address in each exchange cycle in the first register B.

The first register B is further configured to output the first address to the buffer 110 in each exchange cycle, and the first control logic module 122 is configured to control, in each exchange cycle, to read first address data corresponding to the first address from the buffer 110, and store the corresponding first address data in the second register A in each exchange cycle.

The first register B is further configured to output the second address to the buffer 110 in each exchange cycle, and the first control logic module 122 is configured to write the corresponding first address data in the second register A into the corresponding second address in the buffer 110 in each exchange cycle, while reading second address data corresponding to the second address from the buffer 110, and storing the corresponding second address data in the second register A.

The first register B is further configured to output the first address to the buffer 110 in each exchange cycle, and the first control logic module 122 is further configured to write the corresponding second address data in the second register A into the corresponding first address in the buffer 110 in each exchange cycle.

After all of the exchange cycles are completed, the first control logic module 122 may control to output the target spike sequence obtained from the buffer 110 after multiple times of data exchange.

For example, in each data exchange process, the first random number generation module 121 generates two addresses, and each time one address is randomly generated, firstly addrA (the first address) and then addrB (the second address). The first control logic module 122 firstly controls to read dataA (the first address data) corresponding to addrA from the buffer 110, then writes dataA into addrB in the buffer 110, while reading dataB (the second address data) corresponding to addrB from the buffer 110, and finally writes dataB into addrA in the buffer 110 to complete one data exchange process.

The first address and the second address randomly generated in one data exchange are different.

In an implementation, the first random number generation module 121 adopts a linear feedback shift register (LFSR) structure, which can reduce hardware power consumption.

With the apparatus of the present disclosure, after the buffer 110 completes data initialization, i.e., generates the initial spike sequence, the first control logic module 122 controls to enter an exchange cycle, where each exchange cycle includes the following steps S1 to S5.

In step S1, the first control logic module 122 sends an update enable signal to the first random number generation module 121, and turns off the write enable of the buffer 110.

In step S2, the first random number generation module 121 generates an address addrA, the first control logic module 122 sends an update enable signal to the first random number generation module 121, and turns off the write enable of the buffer 110, where addrA is also stored in the first register B.

In step S3, the first random number generation module 121 generates an address addrB, the first control logic module 122 inputs addrA generated in step S2 (and output from the first register B) into the buffer 110, and reads dataA corresponding to addrA from the buffer 110, and the first control logic module 122 do not send an update enable signal to the first random number generation module 121, and dataA is also stored in the second register A.

In step S4, the first control logic module 122 turns on the write enable of the buffer 110, and inputs addrB generated in step S3 (and output from the first register B) into the buffer 110, and the first control logic module 122 writes dataA from the second register A into addrB in the buffer 110, and meanwhile, the first control logic module 122 reads dataB corresponding to addrB from the buffer, and store dataB in the second register A.

In step S5, the first control logic module 122 turns on the write enable of the buffer 110, inputs addrA generated in step S2 (and output from the first register B) into the buffer 110, and writes dataB from the second register A into addrA in the buffer 110.

The steps S1 to S5 are repeated multiple times (e.g., 10 times), and then the data of each address (i.e., the target spike sequence) in the buffer 110 is sequentially output.

Figure 14:
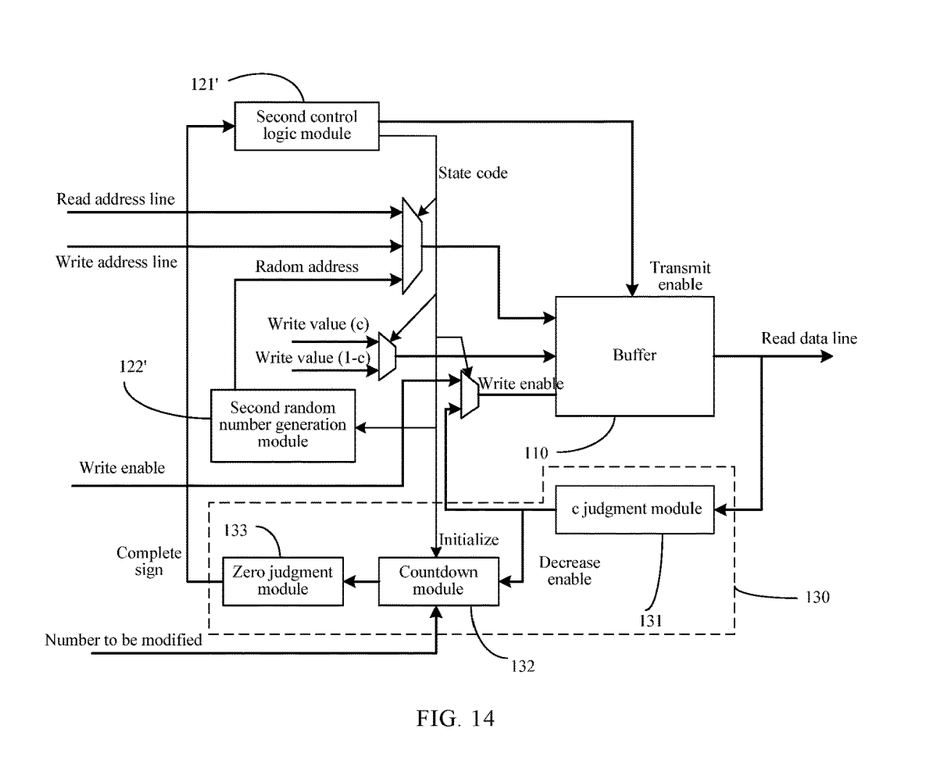
FIG. 14 is yet another block diagram of the apparatus for converting numerical values into spikes according to the present disclosure.

Another apparatus for converting numerical values into spikes is provided in the following embodiment of the present disclosure, in which the buffer 110 is specifically configured to: determine, according to the input numerical values, a consecutive spike train or a consecutive non-spike train formed according to the number of time instants n1 at which a spike is generated in the target spike sequence to be generated, and the number of time instants n2 at which no spike is generated, where n1 and n2 are both integers greater than or equal to 0, and n1 and n2 are not 0 at the same time; and form, according to the number of time instants n1 and the number of time instants n2, the initial spike sequence within a current time period, where the initial spike sequence is selected from one of a consecutive spike train or a consecutive non-spike train.

As shown in FIG. 14, the modifier 120 includes: a second random number generation module 121' configured to determine, according to the number of time instants n1 and the number of time instants n2, the number of time instants n3 at which data modification is expected within the current time period in the initial spike sequence, and the second random number generation module 121' further configured to randomly generate n3 time instants for data modification in the initial spike sequence stored in the buffer 110, where n3 is an integer greater than or equal to 0; and a second control logic module 122' configured to randomly modify data corresponding to the n3 time instants within the current time period in the initial spike sequence stored in the buffer 110, to form the target spike sequence.

As described above, the spiking neural network is a network with time dimension encoded information. By way of example, the minimum time unit for the operation process of the spiking neural network is time instant. Each time instant may have or not have a spike, and the spike information at each time instant is a binary variable, i.e., with or without a spike. For example, one time period includes R time instants, and R=n1+n2, where n1 time instants have spikes, n2 time instants do not have spikes, and spikes are distributed at time instants as random as possible within this time period.

The total number n1 of spikes in the target spike sequence to be generated is in positive correlation with the input numerical values, the target spike sequence is a spike sequence with random time dimension, and each input numerical value is converted into a target spike sequence with random time dimension.

In an implementation, the initial spike sequence is a consecutive spike train or a consecutive non-spike train formed according to the number of time instants n1 at which a spike is generated in the target spike sequence, and the number of time instants n2 at which no spike is generated.

The buffer 110 may determine, according to the input numerical values, the number of time instants n1 at which a spike is generated and the number of time instants n2 at which no spike is generated in the target spike sequence to be generated.

If the number of time instants n1 is greater than or equal to the number of time instants n2, the buffer 110 is configured to write a c value into each time instant within the current time period in the buffer 110, to form the initial spike sequence including a consecutive spike train, where c=1.

If the number of time instants n1 is less than the number of time instants n2, the buffer 110 is configured to write a c value into each time instant within the current time period in the buffer 110, to form the initial spike sequence including a consecutive non-spike train, where c=0.

As used herein, c=1 indicates that a spike is generated at each time instant within the current time period, and c=0 indicates that no spike is generated at each time instant within the current time period.

The input numerical values may include, for example, pixel numerical values of an image, numerical values converted from voice waveform, numerical values converted from text, calculation results from image preprocessing, or the like. The input numerical values are not specifically limited in the present disclosure.

In another implementation, if the number of time instants n1 is greater than or equal to the number of time instants n2, and c=1, then the second random number generation module 121' determines that n3 equals to n2; and if the number of time instants n1 is less than the number of time instants n2, and c=0, then the second random number generation module 121' determines that n3 equals to n1.

In an implementation, the second random number generation module 121' is configured to generate, in each modification cycle, to-be-overwrite time instants at which data in the buffer is to be modified. The number of modification cycles is n3. That is, the number of the to-be-overwrite time instants is n3.

In an implementation, the second random number generation module 121' may also adopt the linear feedback shift register (LFSR) structure, which can reduce hardware power consumption.

In an implementation, the second control logic module 122' is configured to: write, in each modification cycle, a value 1-c to a corresponding to-be-overwrite time instant within the current time period in the buffer 110, traverse the n3 to-be-overwrite time instants until the value 1-c is written to all of the n3 to-be-overwrite time instants within the current time period in the buffer, where 1-c is selected from one of 0 or 1, and the value of 1-c is determined according to a magnitude relation of n1 and n2.

Specifically, if the number of time instants n1 is greater than or equal to the number of time instants n2, then 1-c is 0, and the spikes corresponding to the to-be-overwrite time instants within the current time period in the buffer 110 are deleted; and if the number of time instants n1 is less than the number of time instants n2, then 1-c is 1, and spikes are sent to the to-be-overwrite time instants within the current time period in the buffer 110.

With the apparatus of the present disclosure, the number of the time instants n1 and the number of time instants n2 can be determined in advance according to the input numerical values, according to which a c value is written into each time instant within the current time period in the buffer 110. If the number of time instants n1 is greater than or equal to the number of time instants n2, each time instant within the current time period in the buffer may be written with 1 (i.e., generate a spike), and then the second control logic module 122' writes 0 to n3 time instants therein, i.e., deletes spikes corresponding to the n3 time instants. If the number of time instants n2 is greater than the number of time instants n1, each time instant within the current time period in the buffer 110 may be written with 0 (i.e., not generate a spike), and then the second control logic module 122' writes 1 to n3 time instants therein, i.e., sends spikes to the n3 time instants.

In another implementation, the apparatus further includes a cycle control counter 130 configured to count the number of data pieces modified by the second control logic module 122', and each time a data piece is modified by the second control logic module 122', the count of the cycle control counter 130 is subtracted by 1, until all of the data pieces corresponding to the n3 time instants within the current time period in the buffer 110 are modified by the second control logic module 122'.

As an implementation, the cycle control counter 130 is preset with a numerical value n3. Each time a data piece is modified by the second control logic module 122', the number of data pieces stored in the cycle control counter 130 is subtracted by 1. When the second control logic module 122' completes modification of n3 data pieces, the number of data pieces in the cycle control counter 130 is reduced to 0.

Each time, the random number generation module 121' generates a random number that indicates a time instant position of the data to be modified (i.e., the to-be-overwrite time instant), and the second control logic module 122' checks whether data has been modified at the to-e-overwrite time instant. If the data at the to-be-overwrite time instant has been modified, the second control logic module 122' informs the second random number generation module 121' to regenerate a random number, that is, to re-determine a time instant position of the data to be modified (i.e., re-determine the to-be-overwrite time instant), until a time instant at which the data is not modified is determined. If the data corresponding to the to-be-overwrite time instant generated by the second random number generation module 121' has not been modified, the second control logic module 122', after modifying the data corresponding to the to-be-overwrite time instant, informs the second random number generation module 121' to regenerate a random number, informs the cycle control counter 130 to subtract 1 from the number of the data pieces to be modified, and repeats the cycle until the number of the data pieces to be modified is 0. Then, the modification process is ended, and the obtained spike sequence is output as a result.

In an implementation, as shown in FIG. 14, the cycle control counter 130 includes: a c judgment module 131 configured to judge the data of the buffer 110 within the current time period; a countdown module 132 configured to store, in each modification cycle, the number of remaining to-be-overwrite time instants, where when the c judgment module 131 determines that a full c value is written into the buffer 110, and the second control logic module 122' writes the value 1-c into the to-be-overwrite time instant corresponding to each modification cycle within the current time period in the buffer 110, the countdown module 132 reduces the number of remaining to-be-overwrite time instants by 1, and where the first modification cycle corresponds to n3 remaining to-be-overwrite time instants; and a zero judgment module 133 configured to judge whether the number of remaining to-be-overwrite time instants in the countdown module 132 is 0.

As shown in FIG. 14, the apparatus of the present disclosure may have three states.

State 1, a loaded state in which: a write address line is used to traverse all addresses (all time instants in each time period), a full c value is written into the buffer 110, and the number n3 of data pieces to be modified is written into the countdown module 132 as an initialization value.

State 2, a modified state in which: the second random number generation module 121' generates a random address, and reads address data from the buffer 110 according to the address, the c judgment module 131 makes judgment and, if it is c, informs the countdown module 132 to reduce the stored numerical value by 1, and turns on the write enable to write the value 1-c into that address in the buffer 110, while judging whether the numerical value stored in the countdown module 132 is 0, and if it is 0, informs the second control logic module 122' to enter state 3, otherwise remains in state 2, and the second random number generation module 121' further generates a new address, and the cycle continues.

State 3, an output state in which: a read address line is used to traverse all of the addresses, and the data in the buffer is output.

As a third aspect of the present disclosure, there is provided an electronic device, including a server, a terminal, or the like. The electronic device includes: at least one processor; a memory communicatively connected to the at least one processor; and a communication component communicatively connected to a storage medium. The communication component receives and transmits data under control of the processor. The memory stores thereon instructions executable by the at least one processor so that when executed by the at least one processor, the instructions cause the method for converting numerical values into spikes according to any of the above embodiments to be implemented.

In an implementation, as a nonvolatile computer-readable storage medium, the memory may be configured to store nonvolatile software programs, nonvolatile computer-executable programs, and modules. The processor executes the nonvolatile software programs, instructions and modules stored in the memory, so as to perform various functional applications and data processing of the apparatus, that is, implement the method for converting numerical values into spikes.

The memory may include a program storage area and a data storage area. The program storage area may store an operating system, or an application program required for at least one function; and the data storage area may store a list of options, etc. Further, the memory may include a high speed random access memory, and may further include a non-volatile memory, such as at least one magnetic disk memory device, flash memory device, or other non-volatile solid state memory devices. In some embodiments, the memory may optionally include a memory remotely disposed relative to the processor, which may be connected to an external device via a network. Examples of such networks include, but are not limited to, the Internet, intranets, local area networks, mobile communication networks, and combinations thereof.

One or more modules are stored in the memory, which, when executed by the one or more processors, perform the method for converting numerical values into spikes according to any of the above method embodiments.

The product described above can perform the method for converting numerical values into spikes according to the embodiments of the present application, and has corresponding functional modules and beneficial effects of the execution method. Technical details that are not described in detail in this embodiment may refer to the method for converting numerical values into spikes according to any of the embodiments of the present application.

As a fourth aspect of the present disclosure, there is provided a computer-readable storage medium having a computer-readable program stored thereon. The computer-readable program is configured to be executed by a computer to implement part or all of the above embodiments of the method for converting numerical values into spikes according to any of the above embodiments to be implemented.

In other words, those skilled in the art will appreciate that all or part of the steps in the methods according to the foregoing embodiments may be implemented by a program instructing related hardware, where the program is stored in a storage medium and includes several instructions to enable a device (which may be a micro controller unit, a chip, or the like) or a processor to perform all or part of the steps of the methods according to various embodiments of the present application. The storage medium mentioned before includes: a U disk, a mobile hard disk, a read-only memory (ROM), a random access memory (RAM), a disk or optical disk, and other media that can store a program code.

In the description provided herein, numerous specific details are set forth. However, it is to be understood that embodiments of the present disclosure may be implemented without these specific details. In some instances, well-known methods, structures and techniques are not shown in detail in order not to obscure understanding of this description.

Moreover, those of ordinary skill in the art will appreciate that although some embodiments described herein include some features included in other embodiments, not others, combinations of features of different embodiments are meant to be within the scope of the present disclosure and form different embodiments. For example, in the claims, any of the claimed embodiments may be used in any combination.

It will be understood by those skilled in the art that while the present disclosure has been described with reference to exemplary embodiments, various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not be limited to the particular embodiments disclosed, but that the present disclosure includes all embodiments falling within the scope of the appended claims.

What is claimed is:

1. A method for converting numerical values into spikes, which is used for converting input numerical values into a spike sequence in a spiking neural network, and the method comprises:

generating an initial spike sequence according to the input numerical values, wherein the initial spike sequence comprises at least one data string, each of which is independently selected from one of a consecutive spike train or a consecutive non-spike train, the number of spikes in all of the at least one data string is equal to an expected value of the number of spikes in a target spike sequence to be generated, and the target spike sequence to be generated is a spike sequence of the spiking neural network within a time period; and randomly selecting and modifying data from the initial spike sequence, to form the target spike sequence, wherein generating the initial spike sequence according to the input numerical values comprises:

determining, according to the input numerical values, a number of time instants $n1$ at which a spike is generated in the target spike sequence to be generated, and a number of time instants $n2$ at which no spike is generated, where $n1$ and $n2$ are both integers greater than or equal to 0, and $n1$ and $n2$ are not 0 at the same time; and forming, according to the number of time instants $n1$ and the number of time instants $n2$, the initial spike sequence within a current time period, wherein the initial spike sequence is selected from one of the consecutive spike train or the consecutive non-spike train, and randomly selecting and modifying data from the initial spike sequence, to form the target spike sequence comprises:

determining, according to the number of time instants $n1$ and the number of time instants $n2$, a number of time instants $n3$ at which data modification is expected within the current time period in the initial spike sequence, where $n3$ is an integer greater than or equal to 0; and randomly modifying data corresponding to n3 time instants within the current time period in the initial spike sequence, to form the target spike sequence.

2. The method according to claim 1, wherein the initial spike sequence comprises a plurality of data strings which comprise consecutive spike trains and consecutive non-spike trains, and
randomly selecting and modifying data from the initial spike sequence, to form the target spike sequence comprises:
randomly exchanging positions of the data in the initial spike sequence to form the target spike sequence.

3. The method according to claim 2, wherein generating the initial spike sequence according to the input numerical values comprises:
determining, according to the input numerical values, a number of time instants T and a frequency of generating spike n in the target spike sequence to be generated, where T is an integer greater than 0, n is greater than or equal to 0, and n is less than 1; and
generating a consecutive spike train comprising n*T consecutive spikes and a consecutive non-spike train comprising T-n*T consecutive non-spikes, to form the initial spike sequence.

4. The method according to claim 2, wherein randomly exchanging positions of the data in the initial spike sequence to form the target spike sequence comprises a plurality of exchange cycles each involving:
randomly generating two addresses in a spike sequence processed in a current cycle; and
exchanging data corresponding to the two addresses in the spike sequence processed in the current cycle,
wherein the two addresses are different from each other, the spike sequence processed in the first exchange cycle is the initial spike sequence, and the spike sequence processed in the $i^{th}$ exchange cycle is a spike sequence formed through data exchange in the $(i-1)^{th}$ exchange cycle, where i is a natural number greater than or equal to 2.

5. The method according to claim 4, wherein randomly generating two addresses in the spike sequence processed in the current cycle comprises:
randomly generating a first address and a second address;
exchanging data corresponding to the two addresses in the spike sequence processed in the current cycle comprises:
writing data corresponding to the first address in the spike sequence processed in the current cycle into the second address in the spike sequence processed in the current cycle, to obtain an intermediate spike sequence; and
writing data corresponding to the second address in the spike sequence processed in the current cycle into the first address in the intermediate spike sequence.

6. The method according to claim 1, wherein forming, according to the number of time instants n1 and the number of time instants n2, the initial spike sequence within the current time period comprises:
generating, in a case that the number of time instants n1 is greater than or equal to the number of time instants n2, a spike at each time instant within the current time period, to form the initial spike sequence comprising a consecutive spike train; and
determining, according to the number of time instants n1 and the number of time instants n2, the number of time instants n3 at which data modification is expected within the current time period in the initial spike sequence comprises:
determining that n3 equals to n2.

7. The method according to claim 6, wherein randomly modifying the data corresponding to the n3 time instants within the current time period in the initial spike sequence, to form the target spike sequence comprises:
performing a zeroing step for n3 times, and the zeroing step comprising:
randomly generating a to-be-zeroed time instant in the spike sequence processed in the current zeroing step; and
setting, in a case that data corresponding to the to-be-zeroed time instant in the spike sequence processed in the current zeroing step is 1, the data corresponding to the to-be-zeroed time instant to 0,
wherein when the zeroing step is executed for the first time, the spike sequence processed in the current zeroing step is the initial spike sequence, when the zeroing step is executed for the $j^{th}$ time, the spike sequence processed in the current zeroing step is a spike sequence generated from the $(j-1)^{th}$ zeroing step, and the spike sequence generated from the final zeroing step is the target spike sequence, where j is a natural number, and j=2, . . . n3.

8. The method according to claim 1, wherein forming, according to the number of time instants n1 and the number of time instants n2, the initial spike sequence within the current time period comprises:
not generating, in a case that the number of time instants n1 is less than the number of time instants n2, any spike at each time instant within the current time period, to form the initial spike sequence comprising a consecutive non-spike train; and
determining, according to the number of time instants n1 and the number of time instants n2, the number of time instants n3 at which data modification is expected within the current time period in the initial spike sequence comprises:
determining that n3 equals to n1.

9. The method according to claim 8, wherein randomly modifying the data corresponding to the n3 time instants within the current time period in the initial spike sequence, to form the target spike sequence comprises:
performing a set-to-one step for n3 times, and the set-to-one step comprising:
randomly generating a to-be-set-to-one time instant in the spike sequence processed in the current set-to-one step; and
setting, in a case that data corresponding to the to-be-set-to-one time instant in the spike sequence processed in the current set-to-one step is 0, the data corresponding to the to-be-set-to-one time instant to 1,
wherein when the set-to-one step is executed for the first time, the spike sequence processed in the current set-to-one step is the initial spike sequence, when the set-to-one step is executed for the $j^{th}$ time, the spike sequence processed in the current set-to-one step is a spike sequence generated from the $(j-1)^{th}$ set-to-one step, and the spike sequence generated from the final set-to-one step is the target spike sequence, where j is a natural number, and j=2, . . . n3.

10. The method according to claim 1, wherein the input numerical values comprise pixel numerical values of an image, and the expected value of the number of spikes is in positive correlation with the pixel numerical values of the image.

11. An apparatus for converting numerical values into spikes, which is configured to convert input numerical values into a spike sequence in a spiking neural network, and the apparatus comprises:
- a buffer configured to generate an initial spike sequence according to the input numerical values and store the initial spike sequence, wherein the initial spike sequence comprises at least one data string, each of which is independently selected from one of a consecutive spike train or a consecutive non-spike train, the number of spikes in all of the at least one data string is equal to an expected value of the number of spikes in a target spike sequence to be generated, and the target spike sequence to be generated is a spike sequence of the spiking neural network within a time period; and
- a modifier configured to modify data in the initial spike sequence to form the target spike sequence, wherein the buffer is further configured to:
- determine, according to the input numerical values, a number of time instants n1 at which a spike is generated in the target spike sequence to be generated, and a number of time instants n2 at which no spike is generated, where n1 and n2 are both integers greater than or equal to 0, and n1 and n2 are not 0 at the same time; and
- form, according to the number of time instants n1 and the number of time instants n2, the initial spike sequence within a time period, wherein the initial spike sequence is selected from one of the consecutive spike train or the consecutive non-spike train, and the modifier comprises:
- a second random number generation module configured to determine, according to the number of time instants n1 and the number of time instants n2, a number of time instants n3 at which data modification is expected within the current time period in the initial spike sequence, and the second random number generation module further configured to randomly generate n3 time instants for data modification in the initial spike sequence stored in the buffer, where n3 is an integer greater than or equal to 0; and
- a second control logic module configured to randomly modify data corresponding to the n3 time instants within the current time period of initial spike sequence stored in the buffer, to form the target spike sequence.

12. The apparatus according to claim 11, wherein the initial spike sequence comprises a plurality of data strings which comprise consecutive spike trains and consecutive non-spike trains, and
- the modifier is configured to randomly exchange positions of the data in the initial spike sequence to form the target spike sequence.

13. The apparatus according to claim 12, wherein the buffer is further configured to determine, according to the input numerical values, a number of time instants T and a frequency of generating spike n in the target spike sequence to be generated, and generate a consecutive spike train comprising n*T consecutive spikes and a consecutive non-spike train comprising T−n*T consecutive non-spikes, to form the initial spike sequence, where T is an integer greater than 0, n is greater than or equal to 0, and n is less than 1.

14. The apparatus according to claim 12, wherein the modifier comprises:

- a first random number generation module configured to randomly generate, in each exchange cycle, two addresses in a spike sequence processed in a corresponding cycle; and
- a first control logic module configured to exchange, in each exchange cycle, data corresponding to the two addresses in the spike sequence processed in a corresponding cycle, wherein the two addresses are different from each other, the spike sequence processed in the first exchange cycle is the initial spike sequence, and the spike sequence processed in the $i^{th}$ exchange cycle is a spike sequence formed through data exchange in the $(i-1)^{th}$ exchange cycle, where i is a natural number greater than or equal to 2.

15. The apparatus according to claim 14, further comprising:
- a first register configured to store addresses generated by the first random number generation module, wherein each of the addresses is within an address interval [0, T), wherein T is a number of time instants in the target spike sequence, and T is an integer greater than 0; and
- a second register configured to store data corresponding to the addresses output from the buffer.

16. The apparatus according to claim 11, wherein
- in a case that the number of time instants n1 is greater than or equal to the number of time instants n2, the buffer is configured to write a c value into each time instant within the current time period in the buffer, to form the initial spike sequence comprising a consecutive spike train, where c=1; and
- in a case that the number of time instants n1 is less than the number of time instants n2, the buffer is configured to write a c value into each time instant within the current time period in the buffer, to form the initial spike sequence comprising a consecutive non-spike train, where c=0.

17. The apparatus according to claim 11, wherein the second random number generation module is configured to generate, in each modification cycle, to-be-overwrite time instants at which data in the buffer is to be modified, and the number of the to-be-overwrite time instants is n3.

18. The apparatus according to claim 11, further comprising:
- a cycle control counter configured to count the number of data pieces modified by the second control logic module, and each time a data piece is modified by the second control logic module, the count of the cycle control counter is subtracted by 1, until all of the data pieces corresponding to the n3 time instants within the current time period in the buffer are modified by the second control logic module.

19. An electronic device, comprising a memory and a processor, wherein the memory is configured to store one or more computer instructions, and when the one or more computer instructions are executed by the processor, the processor implements the method according to claim 1.

20. A non-transitory computer-readable storage medium having a computer program stored thereon, wherein when the computer program is executed by a processor, the processor implements the method according to claim 1.

* * * * *